United States Patent [19]
Minarovic

[11] Patent Number: 6,133,738
[45] Date of Patent: Oct. 17, 2000

[54] DETECTABLE TRANSPONDER REEL HOUSING

[76] Inventor: Joe T. Minarovic, 201 Logan Ranch Rd., Georgetown, Tex. 78628

[21] Appl. No.: 09/165,402

[22] Filed: Oct. 2, 1998

[51] Int. Cl.[7] .............................. G01V 3/08; G01V 3/11; G08C 21/00; H04B 5/02

[52] U.S. Cl. .......................... 324/326; 324/329; 116/209; 52/103

[58] Field of Search ............................. 324/67, 326–329, 324/345; 52/103; 116/204, 209; 340/572.5, 572.8, 825.49; 405/157; 379/25, 26; 342/459

[56] References Cited

U.S. PATENT DOCUMENTS

| | | | |
|---|---|---|---|
| 3,836,842 | 9/1974 | Zimmermann et al. | ............. 324/329 X |
| 4,055,796 | 10/1977 | Nelson | ..................... 324/326 |
| 4,143,251 | 3/1979 | Clark | ................... 324/326 X |
| 4,195,380 | 4/1980 | Higgs . | |
| 4,334,227 | 6/1982 | Marks . | |
| 4,549,039 | 10/1985 | Charlebois et al. | ................ 324/326 X |
| 4,712,094 | 12/1987 | Bolson, Sr. | .......................... 324/329 X |
| 4,862,088 | 8/1989 | Etienne et al. | ............................ 324/326 |
| 5,017,415 | 5/1991 | Cosman et al. | ...................... 324/326 X |
| 5,771,835 | 6/1998 | Schneider | ................................. 116/209 |

*Primary Examiner*—Gerard Strecker
*Attorney, Agent, or Firm*—Felsman, Bradley, Vaden, Gunter & Dillon, LLP

[57] ABSTRACT

A device for electronically marking a buried object, such as a service drop cable, comprising a reel for retaining the cable in a known position and orientation, and a transponder positioned at a predetermined location and orientation with respect to the cable wound on the reel. A foam shield may be used to provide a visual indication of the presence of the device, and an anchor may be affixed to the reel to secure it more firmly in the ground. The transponder can be located within the hub of the reel. The transponder can be active or passive.

13 Claims, 2 Drawing Sheets

DETECTABLE TRANSPONDER REEL HOUSING

BACKGROUND OF THE INVENTION

1. Field of the Invention

The present invention generally relates to devices used to electromagnetically mark and locate obscured (buried) objects, and more particularly to a spool or reel adapted to retain cabling, such as a service drop wire, and house a transponder or marker to enable the later location of the buried reel.

2. Description of Related Art

Buried conduits are employed for supplying a wide variety of utilities, including pipelines for gas, water and sewage, and cables for telephone, optical fiber, power and television. It often becomes necessary to locate defective or damaged cables, pipes, etc., in order to repair or replace them. Conversely, it is important to know with as much accuracy as possible the approximate vicinity of such items in order to avoid disturbing them when digging or excavating for other purposes. Above-ground marking devices may be installed immediately after the conduit is buried, but they are often lost, stolen, or destroyed after a short period of use. Therefore, it is common to use underground marking devices or systems to enable the later location of a section or feature of an underground utility.

In the past, three different approaches have been used to indicate the presence of buried conduits, namely, warning tapes, trace wires, and electronic marker systems. A warning tape is simply a band of plastic which is placed above the conduit before burial. These tapes are used to alert the excavation team of the presence of the conduit before any damage thereto might occur. As the backhoe or other mechanical digger excavates the site, it will hopefully uproot a portion of the warning tape prior to contact with the conduit. The primary disadvantage of (non-metallic) warning tapes is that they cannot be detected by any surface instrumentation.

A single trace wire is sometimes buried with a utility line. The trace wire is used as a conductor for an AC signal which is applied to the wire at one accessible end, and then acts as an antenna and radiates an electromagnetic field above ground along its entire length. The electromagnetic field may be detected with an appropriate receiver, and the underground path of the line thereby determined. The earliest cable locators used a single sensor which detects a single null or peak (depending upon the orientation of the sensor) as the unit passes near the cable. Many later devices use two or more sensors that combine the signals to provide an indication of conductor proximity. The most common sensors are ferrite-core antennas, i.e., inductors. Although the conduit itself may act as a conductor (i.e., when steel pipe or copper wire cabling is used), most conduits are non-conductive and therefore require a trace wire. There are three significant disadvantages in the use of a trace wire. First of all, it is necessary to provide above ground access to the trace wire in order to couple the AC signal thereto. Secondly, if a break occurs in the wire (due to excavation, or natural causes such as corrosion, earth movement or burrowing animals), then the wire becomes useless. Finally, the trace wire is too thin to imprint a warning message thereon, precluding any visual warning. Additionally, a receiver cannot distinguish the trace wire from any other conductor in the vicinity.

Electronic marker systems for locating buried objects are known in the art, and generally consist of two types, namely, active and passive markers (transponders). Active markers require the use of a power supply which amplifies a signal source (usually an AC signal). The signal is radiated by the underground marker and detected by a receiver unit above ground. Passive markers, in contrast, have no power supply, but rather operate in a resonant mode, responsive to a transmitted electromagnetic field.

A passive marker is basically a wire coil and capacitor surrounded in a protective envelope, which is then buried adjacent to the cable, pipe, or other object to be located. The marker is self-contained, with no external, accessible connections. Passive markers are activated by radiating a signal into the ground in the area where the marker is expected to be found. The signal is emitted via an inductive coil held close to the surface (the transmitter portion of a transceiver). When the coil is directly over, or near, the passive marker (which is itself an inductive coil), the marker accepts energy within its bandpass and stores it, reaching a sustained amplitude during the transmission cycle. When the transmission cycle ends, the marker re-emits the energy at the marker's resonant frequency with an exponentially decaying amplitude. A second coil within the transceiver unit acts as a receiving antenna which detects the re-radiated energy, alerting the locating technician with an audible tone or other indicator means.

FIG. 1 illustrates several kinds of passive transponders for different applications. These include a small, near-surface marker 2 for locating a valve box, a medium size or mid-range marker 4 for locating a service drop (a loose coil of cabling deployed for future use), a full-range marker 6 for locating a more deeply buried conduit stub, and a so-called ball marker 8 for locating a conduit tee. The latter marker provides a spherical housing which supports the marker coil horizontally, regardless of the orientation of the housing (i.e., self-leveling), and is used for soil conditions which may result in significant shifting of the housing, such that the marker always provides a vertical location beacon (inductor axis).

Electronic markers, as well as warning tapes, are usually color-coded according to the particular type of utility line they mark. Specifically, gas line markers are yellow; telephone cable markers are orange; waste water tunnel markers are green; water pipe markers are blue; and power supply markers are red. Similarly, the passive marker is "coded" by tuning the coil for a specific resonant frequency. Five distinct frequencies have been designated: 83.0 kHz for gas; 101.4 kHz for telephone; 121.6 kHz for sewage; 145.7 kHz for water; and 169.8 kHz for power. In this manner, a locating technician searching for, say, a gas line, cannot accidentally activate a telephone marker since his transmitter will only be sending out an 83 kHz signal, which is not within the bandwidth for a telephone marker tuned for 101.4 kHz. Of course, these frequencies have been designated by convention, and are not meant to be restrictive.

There are hybrid systems wherein, for example, a signal is applied to a buried conductor (cable or trace wire), and coupled through the conductor to one or more markers buried adjacent the conductor. Also, a marker can be used to couple one conductor to another, so that the test signal may be conveyed to the second conductor without a direct physical connection.

While passive electronic markers have several advantages over warning tapes and tracing wires, they are still subject to certain limitations, primarily related to the desired resonant frequency of a particular marker. In a prior art marker, which is essentially an LC circuit, the resonant frequency f is given by the equation $f=1/(2\pi\sqrt{LC})$ where L is the inductance of the wire coil and C is the capacitance of the capacitor. This frequency must be closely controlled in order to adhere to the foregoing tuning conventions and to provide a return signal of maximum amplitude; however, the actual frequency is affected by component construction, manufacturing tolerances, operating temperature, aging, placement and other factors.

One such problem associated with using passive or active transponders for remote identification of buried utility structures is that, if the structure is itself metallic (electrically conductive), then it will influence the detection process by causing a variance in the magnetic lines of flux from metallic sources. It is generally assumed that, to provide accurate locatability, a transponder must be separated from other metallic structures by a minimum of about four inches (10 cm) to avoid magnetic or electromagnetic interference. This effect can in particular be a problem with a service drop such as that illustrated in FIG. 1 wherein the cabling forms a conductive coil. Current methods for locating service drops are highly dependent on field crews for correct placement of transponders for accurate locating (maintaining a predetermined separation distance from the coil of wire). Even with correct placement procedures, movement can occur in a filled ditch or hole as a result of loose unpacked soil, freeze/thaw cycling, water erosion, and other causes.

In light of the foregoing, it would be desirable to devise an improved method of accurately locating a transponder, without dependency on craft skill, adjacent to a buried metallic component of a utility infrastructure, whereby any influence from the metallic component is reduced or eliminated. It would be further advantageous if the method could facilitate the placement of the component itself, such as a service drop wire coil.

SUMMARY OF THE INVENTION

It is therefore one object of the present invention to provide an improved method of deploying an electronic transponder used to locate a buried or otherwise obscured object.

It is another object of the present invention to provide such a method that allows accurate placement of the transponder with respect to a buried metallic utility structure.

It is yet another object of the present invention to provide an article which can be used to achieve such accurate placement of the transponder, and also provide a housing or container for storing the utility structure to be located.

The foregoing objects are achieved in a device for electronically marking a buried object, generally comprising means for retaining the buried object in a known position and orientation, a transponder, and means for positioning the transponder at a predetermined location and orientation with respect to the known position and orientation of the buried object. A foam shield may be attached to the retaining means to provide a visual indication of the presence of the device, and an anchor may be affixed to the retaining means to secure it more firmly in the ground. Means may also be provided for self-leveling of the transponder. In the implementation wherein the buried object is a service drop cable, the retaining means includes a generally cylindrical hub for receiving a winding of the cable, and two generally circular, parallel plates attached to the hub to define a reel for the cable. In this implementation, the transponder is located within the hub. The transponder can be active or passive.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
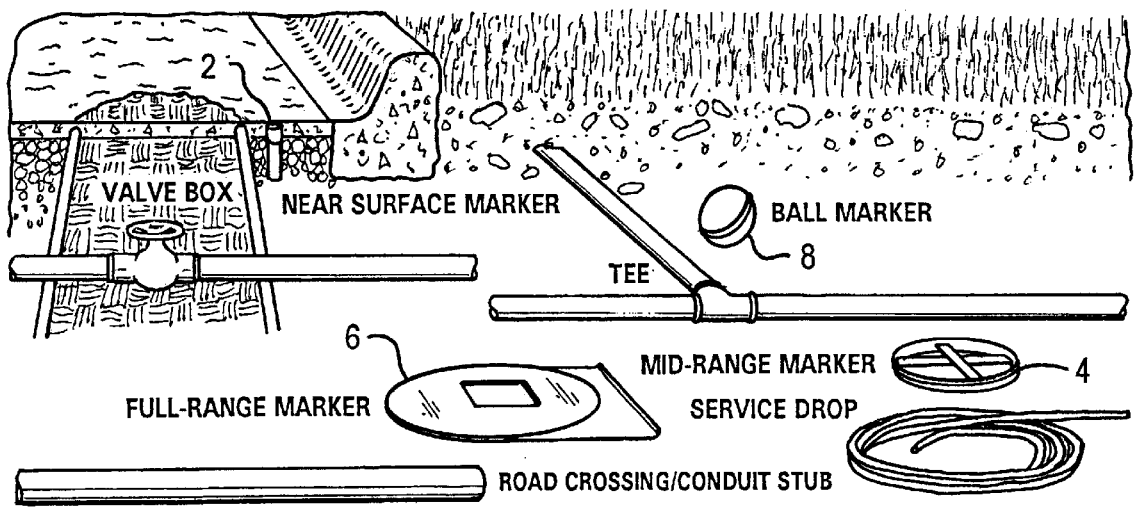
FIG. 1 is a pictorial representation of various underground utility structures which have been marked with electronic transponders to allow conventional location of the structures.
Figure 2:
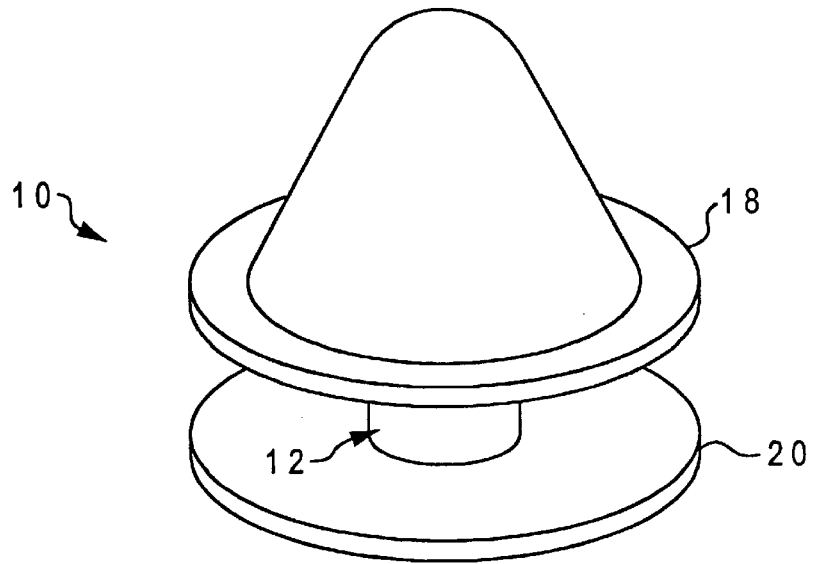
FIG. 2 is a perspective view of one embodiment of the detectable transponder reel housing of the present invention.
Figure 3:
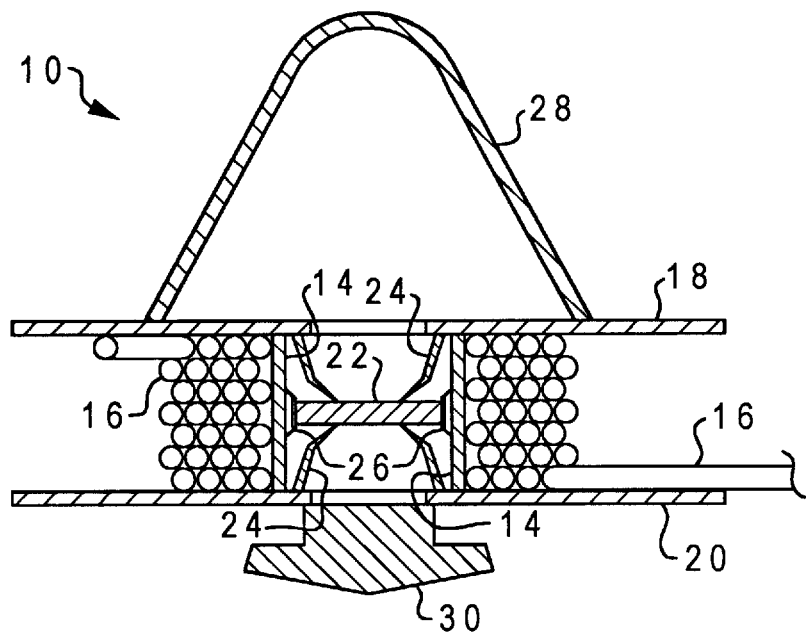
FIG. 3 is a vertical cross-section of the detectable transponder reel housing of FIG. 2.

With reference now to the figures, and in particular with reference to FIGS. 2 and 3, there is depicted one embodiment of a detectable transponder reel housing 10 constructed in accordance with the present invention. Housing 10 is generally comprised of a hub or core portion 12 defining a cylindrical wall 14 about which cabling 16 may be wound, and two discs or plates 18 and 20 which confine the cabling 16 about hub 12. Plates 18 and 20, and hub 12, may be constructed of any durable material, and are preferably integrally formed using injection molding of a polymer such as polyester or high-density polyethylene, or some polymeric blend.

Cabling 16 constitutes a service drop which can be used to provide for timely availability of cable for power, television, or telecommunications (telephony). Utility construction crews typically bury 50 to 150 feet of cable at a property line for future service hook-up for a residence or commercial establishment, so housing 10 is adapted to retain such lengths of cabling. A warning tape may optionally be wound on the reel as the predetermined amount of service drop wire is wound around hub 12.

As shown in FIG. 3, hub 12 is hollow and houses an electronic marker 22 which may be a passive transponder constructed using a capacitor connected to an inductor formed by a coil of wire. The capacitor and wire coil may be contained in a protective envelope which is then secured within hub 12. In the depiction of FIG. 3, the axis of transponder 22 is vertically oriented, and is secured in this position using a plurality of tabs or fingers 24, and an annular flange 26. In this manner, transponder 22 is isolated, or accurately positioned, with respect to cabling 16, so as to reduce or substantially eliminate any electromagnetic influence that the metallic nature of cabling 16 might otherwise cause during detection of transponder 22, which would diminish the available reflective energy used for above-ground detection and locating. A conventional transceiver may be used to detect and locate the transponder.

FIGS. 2 and 3 further illustrate two optional features of the present invention, a dome- or cone-like shield 28, and an anchor 30. Shield 28 is placed atop housing 10, and is constructed of a soft or frangible (crushable) material, such as styrene foam or paper such that, when a trencher is digging, it will "chew" through shield 28, thus visually signaling to the trenching crew the location of the service drop. Shield 28 may be brightly colored or have other warning indicia. Anchor 30 is in the shape of an upside-down mushroom, and serves to more securely hold housing 10 in place within the trench or hole, so that it is less likely to be shifted from flooding, earth settling, etc. Other means may be used to anchor housing 10, such as a stake fixture.

Figure 4:
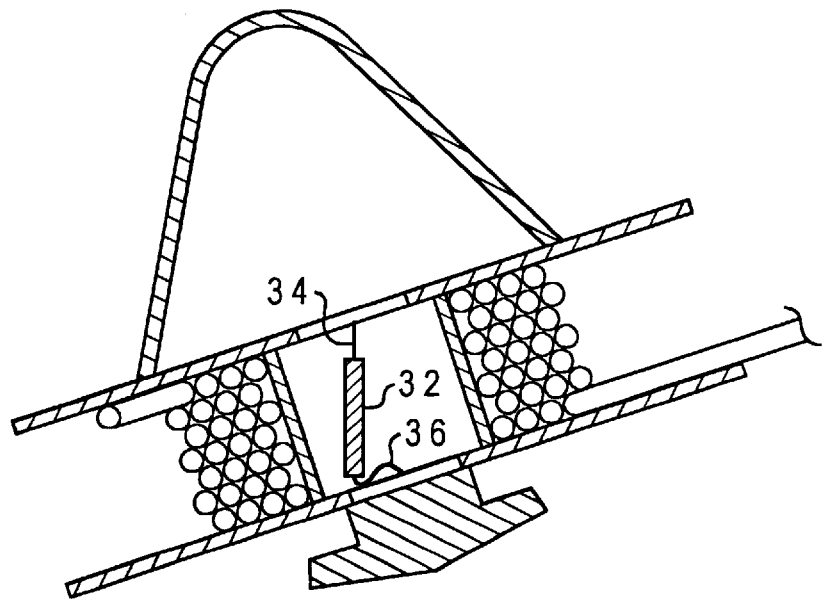
FIG. 4 is a vertical cross-section of an alternative embodiment of the detectable transponder reel housing of the present invention.

Transponder 22 could be positioned further away from cabling 16, e.g., outside the boundaries of plates 18 and 20, if necessary. Other variations in the construction of housing 10 are possible. For example, the transponder used may be of a different construction, and mounted differently within hub 12. FIG. 4 illustrates an alternative embodiment which utilizes a transponder 32 in the form of a ferrite core inductor. Ferrite core inductor 32 is further mounted within hub 12 by suspension from a wire or string 34 such that the inductor maintains a vertical orientation over a wide range of pitch angles of housing 10. A second string 36 may be provided in case the article is inverted more than 180 degrees. Those skilled in the art will appreciate that other means may be used to provide self-leveling of a transponder, such as a gimble mounted within hub 12.

Other alternative geometries include a transponder mounted on the outside of a hub, with cabling retained on the inside of the hub, wherein the transponder is again located at a sufficient separation distance from the cabling. Cabling may be wound in a figure-8 configuration, and a transponder can be located in one side (or both sides) of the figure-8 shape. Also, the hub does not need to be circular or cylindrical. This construction is, however, particularly preferable for fiber optic cabling applications, and in such applications the outer radius of the hub is most preferably greater than the minimum allowable fiber bend radius (currently about 20", or 51 cm).

While the foregoing description contemplates a passive transponder, the invention could alternatively use an active (i.e., battery-powered), multifunction transponder.

The present invention provides a practical and effective solution to the problem associated with using either passive or active transponders for remote identification of underground utility structures, that of adverse influence from the adjacent metallic structure in the detection process. Housing 10 provides an efficient technique for utility construction crews to locate service drops without concern for transponder placement and, at the same time, provides a storage container for the utility structure. Plates 18 and 20 also present a digging shield for the coil of wire wound on the reel.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. An article for marking an obscured structure, comprising:
   means for retaining the obscured structure in a known position; and
   means for positioning a transponder at a predetermined location with respect to the known position wherein the obscured structure is a service drop cable, said retaining means including a hub for receiving a winding of the cable, and one or more plates attached to said hub to define a reel for the cable, said positioning means positioning a transponder within said hub to reduce electromagnetic influence of the cable.

2. The article of claim 1 further comprising a shield constructed of a crushable material and attached to said retaining means to provide a visual indication of the presence of the article.

3. The article of claim 1 further comprising means for anchoring said retaining means.

4. The article of claim 1 further comprising means for self-leveling said transponder.

5. The article of claim 1 wherein said transponder is a passive transponder.

6. The article of claim 5 wherein said passive transponder is a ferrite core inductor.

7. A device for electronically marking a buried object, comprising:
   means for retaining the buried object in a known position and orientation, wherein the buried object is a service drop cable, and said retaining means includes a generally cylindrical hub for receiving a winding of the cable, and one or more generally circular, parallel plates attach to said hub to define a reel for the cable;
   a transponder; and
   means for positioning said transponder within said hub at a predetermined location and orientation with respect to the known position and orientation of the buried object to reduce electromagnetic influence of the cable.

8. The device of claim 7 further comprising a foam shield attached to said retaining means to provide a visual indication of the presence of the device.

9. The device of claim 7 further comprising an anchor affixed to said retaining means.

10. The device of claim 7 further comprising means for self-leveling said transponder.

11. The device of claim 7 wherein said transponder is a passive transponder.

12. The device of claim 11 wherein said passive transponder is a ferrite core inductor.

13. A system for detecting and locating an underground service drop cable, comprising:
   a transponder reel housing having a generally cylindrical, hollow hub with a passive transponder located therein, and having two generally circular, parallel plates attached to said hub to define a reel for the cable, wherein said transponder is positioned at a predetermined location and orientation with respect to said hub to reduce electromagnetic influence of said transponder by the cable; and
   a transceiver for energizing said transponder and sensing a return signal therefrom.

* * * * *